United States Patent [19]
Mitchell

[11] Patent Number: 6,040,684
[45] Date of Patent: Mar. 21, 2000

[54] LITHIUM ION FAST PULSE CHARGER

[75] Inventor: Nathan Mitchell, The Woodlands, Tex.

[73] Assignee: Compaq Computer Corporation, Houston, Tex.

[21] Appl. No.: 08/885,049

[22] Filed: Jun. 30, 1997

[51] Int. Cl.$^7$ .......................... H01M 10/46; H01M 10/44
[52] U.S. Cl. ............................................................. 320/139
[58] Field of Search .................................... 370/125, 129, 370/130, 139, 144, 145, 160, 162, 166, FOR 118, FOR 119, FOR 120, FOR 121, FOR 138

[56] References Cited

U.S. PATENT DOCUMENTS

| | | |
|---|---|---|
| 3,805,146 | 4/1974 | Culley ...................................... 320/166 |
| 3,944,904 | 3/1976 | Hase . |
| 4,354,148 | 10/1982 | Tada et al. . |
| 4,885,521 | 12/1989 | Crampton ................................. 320/126 |
| 5,084,664 | 1/1992 | Gali . |
| 5,289,101 | 2/1994 | Furuta et al. . |
| 5,296,797 | 3/1994 | Bartlett . |
| 5,307,000 | 4/1994 | Podrazhansky et al. . |
| 5,367,244 | 11/1994 | Rose . |
| 5,376,875 | 12/1994 | Yee et al. . |
| 5,408,170 | 4/1995 | Umetsu et al. . |
| 5,412,306 | 5/1995 | Meadows et al. . |
| 5,422,559 | 6/1995 | Hall et al. . |
| 5,440,221 | 8/1995 | Landau et al. . |
| 5,442,274 | 8/1995 | Tamai . |
| 5,481,174 | 1/1996 | Martin et al. . |
| 5,523,671 | 6/1996 | Stewart . |
| 5,541,491 | 7/1996 | Yamazaki et al. . |
| 5,598,085 | 1/1997 | Hasler . |
| 5,614,805 | 3/1997 | Momotani et al. . |
| 5,617,007 | 4/1997 | Keidl et al. . |
| 5,726,554 | 3/1998 | Freiman et al. ......................... 320/157 |

OTHER PUBLICATIONS

"Battery–Management Circuitry Gets Smarter", Sr.Editor, Computer Design's OEM Integration, May 1994, pp. 15–18.

M.Fetcenko et al., "Advantages of Ovonic Alloy System for Portable and EV NI–MH Batteries". No Date.

V.A.Ettel "Advanced Nickel Electrode Structures and Battery Research at INCO" pp. 1–12. No Date.

N.Marincic et al., "Warm Rechargeable Lithium Polymer Batteries For Downhole Application", 1997, 14th Int'l Seminar on Primary & Secondary Batteries.

Benchmarq application, "Using the Bq2003 to Control Fast Charge", Nov. /1994.

Benchmarq, "Using NiMH and Li–Ion Batteries in Portable Applications", Apr., 1995.

Sanyo Data Sheet SF–9470ND, "Rechargeable Battery Charging System", 1996.

Dallas Semiconductor Data Sheet, "DS1633 High–Speed Battery Recharger",052694, 1995.

Maxim Data Sheet, "MAX1259 Battery Manager", 19–4638, Apr. 1994.

Benchmarq Data Sheet, "Bq2002 Fast Charge IC", Sep. 1996.

Benchmarq Data Sheet, "Bq2005 Dual–Battery Fast Charge IC", Sep. 1996.

Benchmarq Data Sheet, "Bq2014 Gas Gauge IC with External Charge Control", Dec., 1995.

Benchmarq Data Sheet, "Bq2053X Lithium Ion Pack Supervisor", Sep. 1996.

Hooper et al., "Pulse Discharge Characteristics of Solid–State Lithium Batteries" Journal of Power Sources, 27, pp. 3–13, 1989.

*Primary Examiner*—Edward H. Tso
*Attorney, Agent, or Firm*—Robert Groover; Betty Formby

[57] ABSTRACT

A lithium-ion cell charging system wherein pulse charging (with excursions above the critical voltage) is followed (once average current has fallen low enough) by charging in a linear regulator mode, using a transistor internal to a battery pack as an element of a linear regulator.

18 Claims, 4 Drawing Sheets

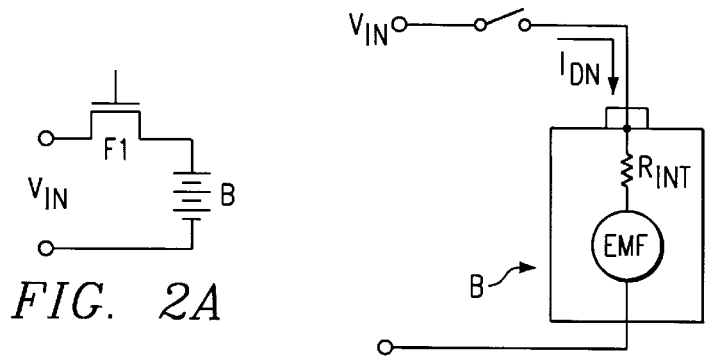
FIG. 2A
FIG. 2C
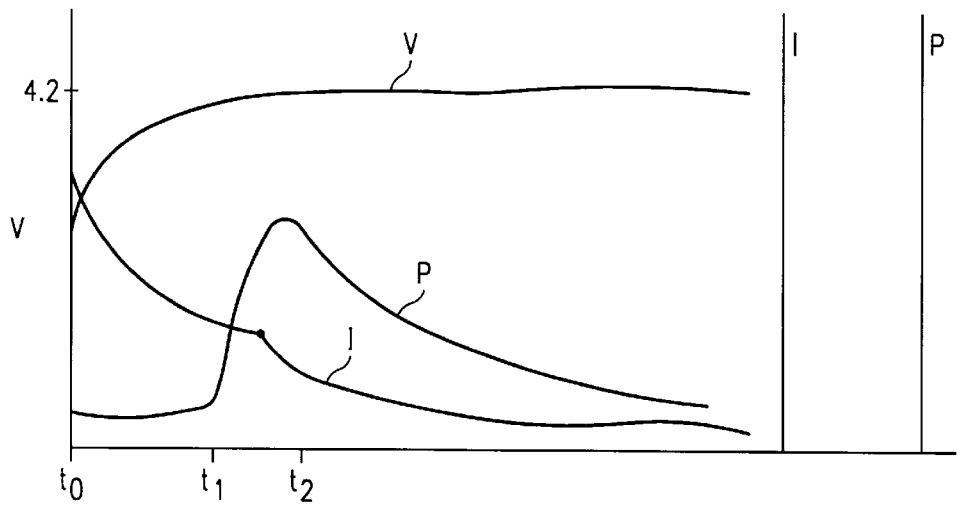
FIG. 2B
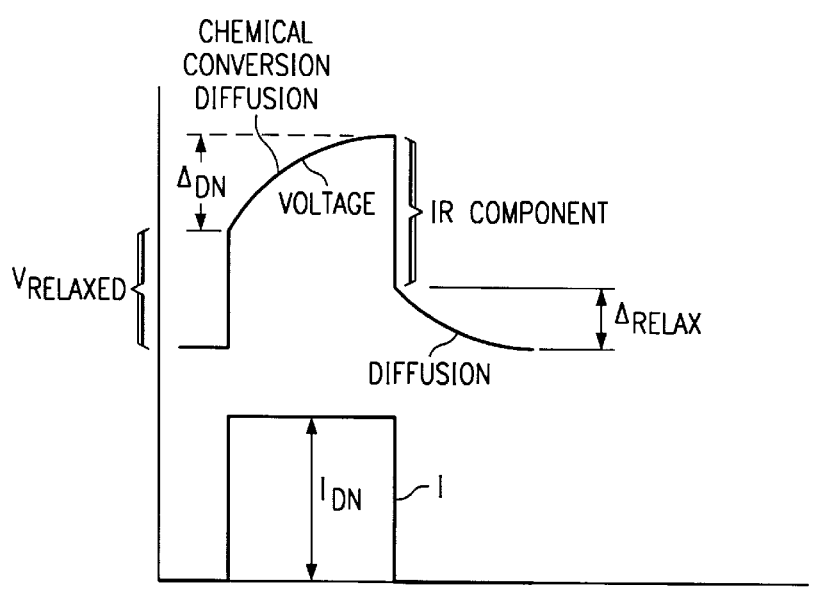
FIG. 2D 6,040,684

LITHIUM ION FAST PULSE CHARGER

BACKGROUND AND SUMMARY OF THE INVENTION

The present invention relates to circuits and methods for rapidly recharging lithium-ion and analogous battery types.

Rechargeable lithium-ion is a promising battery technology which offers high energy density per unit weight, and high voltage per cell. See generally Linden, HANDBOOK OF BATTERIES (2.ed. 1995), which is hereby incorporated by reference. However, this class of battery chemistries has some limitations.

Background: Overvoltages in Lithium-based Battery Chemistries

Lithium-ion batteries use intercalation compounds to contain the unoxidized lithium, and are therefore more stable (under recharging) than batteries which use metallic lithium. (An intercalation compound contains lithium atoms in a matrix of another material, such as graphite.) However, a constraint on lithium-ion batteries is that overvoltages must be strictly avoided. Above a certain critical voltage (typically 4.1 to 4.2 volts, depending on the internal details of the cell), gas can be generated, and metallic lithium can plate onto the anode, and this may lead to instability. Some cells have pressure-activated cutoff switches to disconnect charging current in response to high pressure, but these effects of overvoltage are still of great concern. The conventional wisdom has therefore been that application of voltages above the critical voltage to a rechargeable lithium-ion cell must be strictly avoided at all times.

Transient-Overvoltage Recharging

However, commonly owned U.S. Pat. No. 5,726,554, which is hereby incorporated by reference, describes a lithium-ion charging system in which the applied charging voltage is applied to the battery in pulses, with a gradually decreasing duty cycle, to bring the battery up to full charge. These pulses are allowed to transiently reach values above the critical value (of 4.2 volts or so) in order to bring the voltage between pulses up to the critical value. (Since some of the voltage seen at the cell terminals during charging is an IR voltage drop, and the cells have a quite substantial internal impedance, a voltage above the critical voltage can be applied transiently at the external terminals without necessarily inducing a voltage above the critical voltage across the actual electrodes of the interior of the cell.)

Background: Relaxation Effects

A peculiarity of charging a lithium-ion battery is that the voltage at the end of a charging pulse will not stabilize quickly when the charging current is cut off, but will stabilize only over a period of milliseconds or tens of milliseconds (or possibly more). This effect, known as "relaxation", is caused by the internal electrochemistry of the cell. The charging pulse induces an imbalance in the ion concentration gradients, which is shifted by diffusion effects. That is, at the end of a charging pulse, the anode will be enriched with lithium ions ($Li^+$) at its surface, but will not have achieved a smooth concentration gradient from the surface to the interior of this electrode. As the concentration gradient smoothes out, the voltage of the cell will drop slightly.

FIG. 2C shows a simple circuit model of a battery being charged, together with plots of the voltage and current relations during one pulse of a pulse charging cycle. The battery can be modeled as a series combination of an internal resistance $R_{int}$ with a voltage source EMF, which has a voltage determined by the history of currents applied, in a complicated way. Thus, as the charging current $I_{ch}$ passes through the cell, the internal resistance $R_{int}$ will drop a voltage which is equal to $I_{ch}$ times $R_{int}$, and the voltage across EMF will be clamped to $V_{in} - I_{ch} R_{int}$.

FIG. 2D shows how when the current is switched on, the voltage will immediately jump up from its relaxed value $V_{relax}$, by an amount equal to the IR drop $I_{ch} R_{int}$ across the internal resistance $R_{int}$. Thereafter, the voltage will further increase by an amount $\Delta_{ch}$ Similarly, when the current component $I_{ch}$ is switched off, the voltage will immediately drop by an amount equal to the voltage drop $I_{ch} R_{int}$ across the resistance $R_{int}$. Thereafter, the voltage will further gradually decline, over a period of milliseconds or tens of milliseconds, by an amount $\Delta_{relax}$, to asymptotically approach its relaxed value $V_{relaxed}$.

Background: Linear Regulation of Lithium Battery Charging

One prior technique for avoiding the overvoltage problems is to use linear regulation. As shown in FIG. 2A, a series FET F1 is operated in its linear regime, to impose a voltage drop from the input voltage Vin to the voltage seen by the battery B. However, this requires a significant power dissipation in the FET.

In this prior scheme, as shown in FIG. 2B, the FET can be operated in saturation until time $t_1$, when the voltage across the cell reaches the desired maximum (e.g. 4.2V). The FET then carries an increasing voltage drop, and hence its power dissipation P increases, up until time $t_2$. (The power dissipated in the FET is the product of its voltage drop times the current it passes.)

Background: Integrated Cutoff Transistors

Every lithium ion battery pack conventionally includes a pair of back-to-back FETs which can cut off the charging or discharging current. (Since each FET includes a built in diode, turning off one transistor cuts off the charging current, turning off the other transistor will cut off the discharging current, and turning off both will completely isolate the battery cells.) Since these FETs are merely used for a disconnect operation, they are normally not built with any large power handling capability, and no heat sinking is necessary. The size of these FETs need merely be sufficient to handle the ohmic heating from maximum current under worst-case temperature conditions.

The space constraints in a battery pack are very tight. Thus, the small amount of electronics which is integrated into the battery pack, typically including a temperature sensor as well as the cutoff FETs mentioned above, is typically integrated with surface mount components on a small, flexible circuit board. These space constraints are likely to become even tighter in the future.

Lithium-Ion Fast-Charging

The present application discloses a charging circuit and algorithm for lithium ion batteries (and other analogous battery technologies), in which a pulse charging step (with peak voltages well above the critical voltage) is followed by a regulated charging stage, in which a regulated voltage, with a regulated voltage value which is not significantly greater than the critical voltage, is used to "top up" the battery's charge.

In an alternative and preferred embodiment, the regulated charging period is performed by using the built in weak FET in the battery cell pack as the pass transistor for a chopped linear regulator. Linear regulation is inherently likely to place a large demand on the power handling and heat dissipation capabilities of a transistor, and therefore, this regulator is preferably operated in a chopped linear mode. Chopped linear operation reduces power dissipation in the pass transistor by switching it on and off. Typically, the transistor is switched between a partially on state (which produces the desired regulated voltage at the output) and a full off state. (See generally A. Pressman, SWITCHING AND LINEAR POWER SUPPLY, POWER CONVERTER DESIGN (1977), which is hereby incorporated by reference.)

In a further preferred class of embodiments, a further transition in operating mode is made for the very last stage: the regulator operation changes over from chopped linear regulation to purely analog linear regulation, in which the transistors are operated in the analog mode to top up the cells. This is possible at the end of a cycle because the charging current drawn by the cells themselves at that point has become very small, and thus the preferred method switches to analog linear regulation as soon as the thermal dissipation of the transistors can tolerate this.

Thus, the present application discloses a hybrid pulse/linear battery charge regulation method, which includes some or all of the following phases:

1. Initially, the supply voltage is simply connected to the battery, until the battery voltage first comes up to a target voltage which is at or slightly above the threshold voltage. (Since this is a period of relatively high current and hence high IR losses, the voltage at the terminals can be slightly above the critical voltage without exceeding the critical voltage at the plates of the cell.)

2. Thereafter a variable-duty-cycle and/or variable-frequency pulsed charging method is used, as described in the prior application referenced above, until the duty cycle falls to a minimum threshold value. (Alternatively, this stage can be ended when the fully relaxed cell voltage has reached a threshold value.)

3. Thereafter switched linear regulation is applied, using the cutoff transistor which is internal to the battery pack as the switching transistor, until the charging current has become so low that the power dissipation of the weak cutoff transistor would not be exceeded by fully analog linear regulation;

4. Thereafter fully analog linear regulation is used, using the cutoff transistor in the battery pack.

A particular advantage of this method is that the regulation of the power supply does not have to be tight. A great deal of effort has been expended in obtaining AC/DC adapters which can provide a DC output with a very tightly regulated voltage, to meet the needs of lithium charging. However, the present invention is very advantageous in combination with a more loosely regulated supply, such as a constant-power-output AC/DC adapter.

Another advantage is that switching transistors can be small transistors without good heat-sinking. In fact, this invention can be advantageously implemented with the non-heatsinked transistors which are normally included (for safety reasons) in every lithium-ion battery pack.

BRIEF DESCRIPTION OF THE DRAWING

The disclosed inventions will be described with reference to the accompanying drawings, which show important sample embodiments of the invention and which are incorporated in the specification hereof by reference, wherein:

FIG. 2A shows a circuit configuration for linear regulation of the charging voltage.

FIG. 2B shows power dissipated in the regulator, as well as battery voltage and power, during operation of the circuit of FIG. 2A.

FIG. 2C shows a simple circuit model of a battery being charged, together with plots of the voltage and current relations during one pulse of a pulse charging cycle.

FIG. 2D shows voltage and current waveforms during a pulse of charging voltage.

DETAILED DESCRIPTION OF THE PREFERRED EMBODIMENTS

Figure 3:
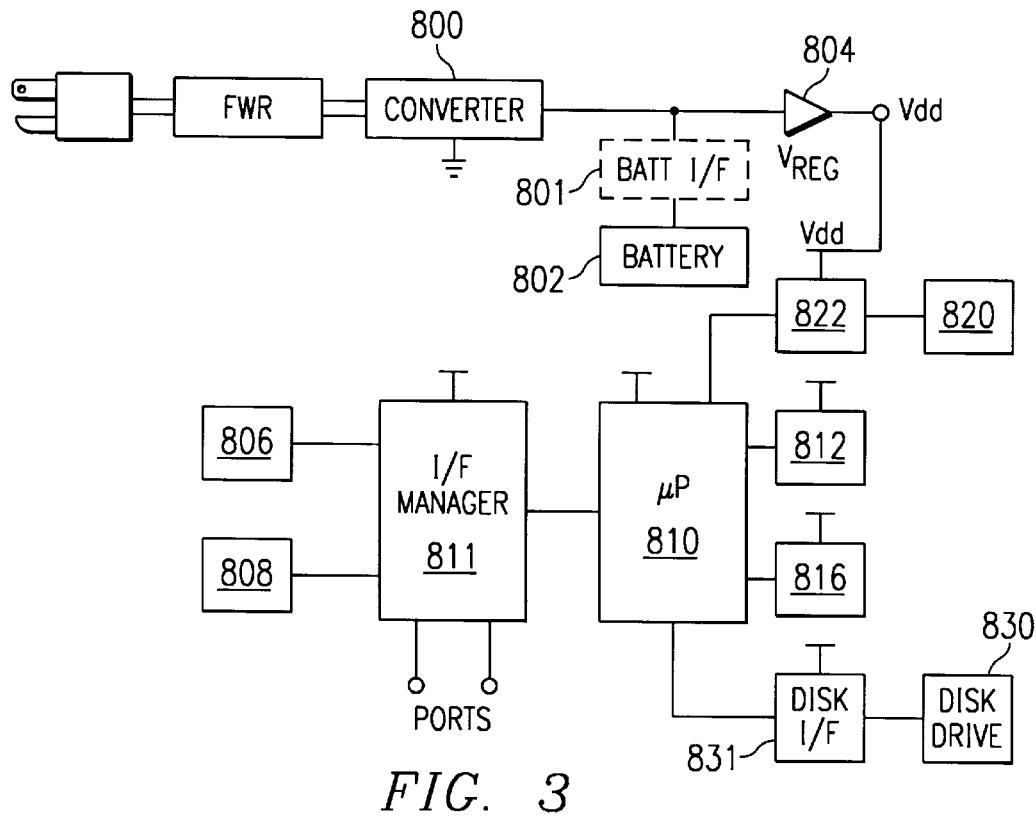
FIG. 3 shows a block diagram of a portable computer including a power converter in which the innovative charging methods can be implemented.

The numerous innovative teachings of the present application will be described with particular reference to the presently preferred embodiment (by way of example, and not of limitation), in which:

FIG. 3 shows a portable computer including a power converter 800 which uses the disclosed charging method to charge battery 802. Optionally, a battery interface 801 is interposed between the battery and the rest of the circuitry. The power converter is connected, through a full-wave bridge rectifier 120, to draw power from AC mains, and is connected to provide a DC voltage to the battery. The battery 802 (or the converter 800), connected through a voltage regulator 804, is able to power the complete portable computer system, which includes, in this example:

user input devices (e.g. keyboard 806 and mouse 808);

at least one microprocessor 810 which is operatively connected to receive inputs from said input device, through an interface manager chip 811 (which also provides an interface to the various ports);

a memory (e.g. flash memory 812 and RAM 816), which is accessible by the microprocessor;

a data output device (e.g. display 820 and display driver card 822) which is connected to output data generated by microprocessor; and a magnetic disk drive 830 which is read-write accessible, through an interface unit 831, by the microprocessor.

Optionally, of course, many other components can be included, and this configuration is not definitive by any means.

Figure 4:
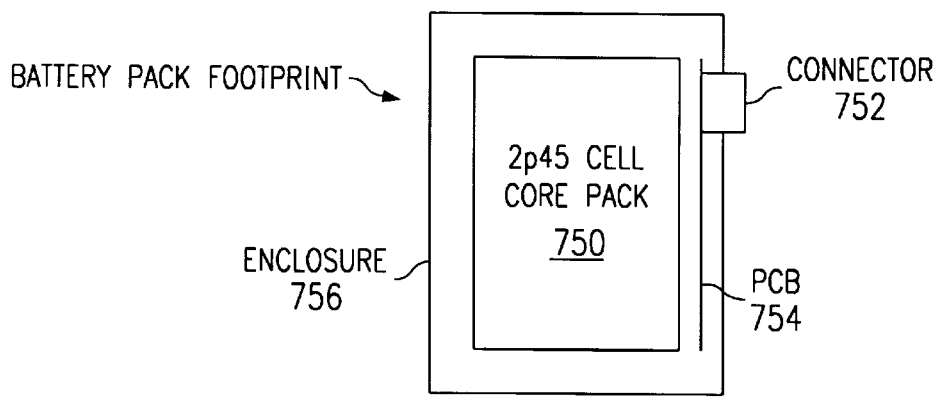
FIG. 4 shows a sample battery-pack with cutoff transistors.

FIG. 4 shows a sample battery-pack with cutoff transistors. Preferably this battery-pack includes 8 lithium-ion cells, connected as 4 series-connected pairs of parallel-connected cells. Each cell, in this example, has a maximum voltage of 4.2 volts. A flexible circuit board includes a temperature sensor, a microcontroller, and a pair of back-to-back cutoff switches.

Figure 5:
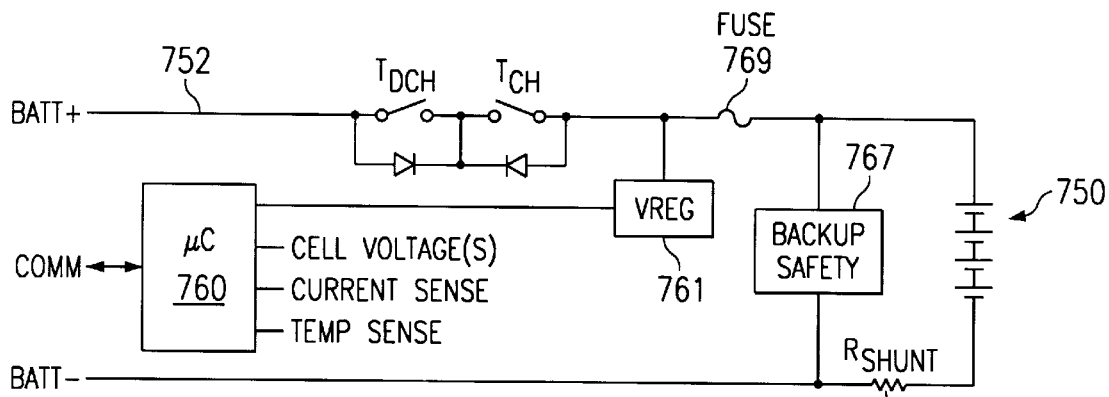
FIG. 5 shows the electrical configuration of the battery of FIG. 4.

FIG. 5 generally shows the electrical configuration of the smart battery pack of FIG. 4. A microcontroller 760 receives various sense inputs, including e.g. battery cell voltage, a temperature sensing input, and a current sensing input (derived from the shunt resistor 763 on the negative side of the cells 750). If more sense inputs are needed, a multiplexer is optionally used to conserve the available ports of the microcontroller. (For example, with a lithium-ion battery it is preferably to monitor the voltage of each cell in a series combination.) The shunt resistor is preferably very small, e.g. about 50 milliohms. The microcontroller 760 also provides communication with host, preferably through a serial bus such as an I²C bus. A stable power supply for the microcontroller 760 (and other control circuitry) is provided by a small regulator 761. A charging transistor $T_{CH}$ cuts off charging current when it is turned off, and a discharging transistor $T_{CH}$ cuts off discharging current when it is turned off. (Note that the built-in diodes of these two transistors are opposed.) Thus the connector 752 includes not only the current-carrying terminals BATT+ and BATT−, but also the lines for the serial communication bus COMM. This connector can also include connections which allow the microcontroller 760 to discern which bay (of a multi-bay system) the smart battery pack is in, and whether it is currently the active battery pack. A conventional backup safety circuit 767 also monitors total battery voltage, and will blow the fuse 769 if for some reason the microcontroller 760 fails to correct an overcharging situation.

Figure 6:
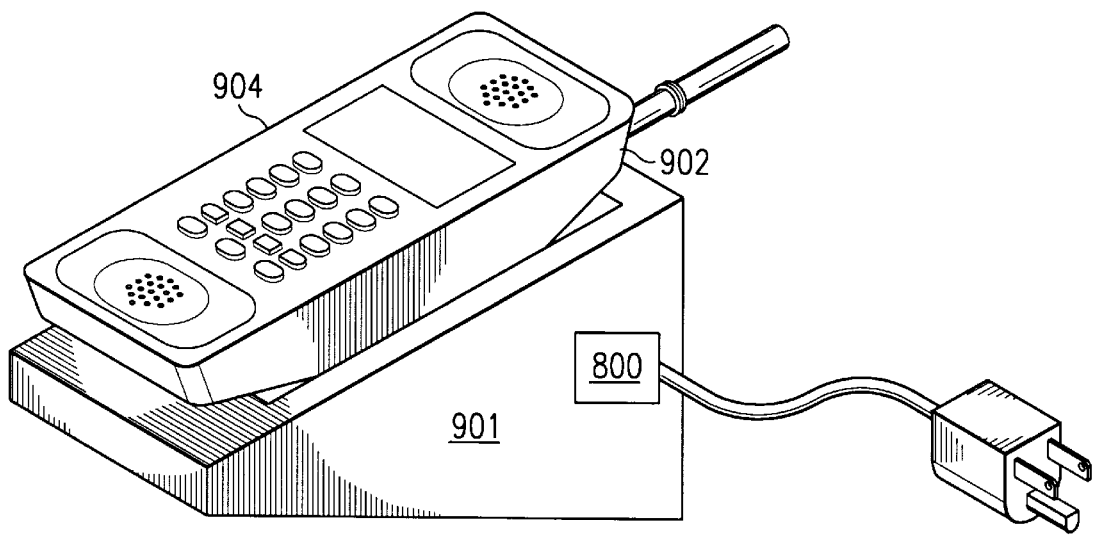
FIG. 6 shows a stand-alone battery charger in which the innovative charging methods can be implemented.

FIG. 6 shows a stand-alone battery charger 901, including a power converter 800, which is used to charge the detachable battery module 902 of a mobile telephone 904 which is placed in the rack of the charger 901. In this system embodiment, the battery charger 901 can use the disclosed charging method. In alternative embodiments, the innovative method can be integrated with other portable electronics.

In the presently preferred embodiment the discharge transistors are small FETs in an SO8 package without heat sink connections at all.

Figure 1A:
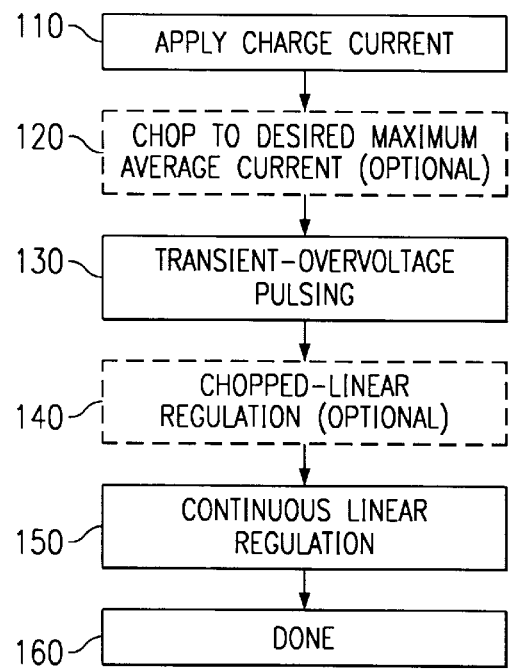
FIG. 1A shows a flow-chart of a single charging cycle according to the present invention.
Figure 1B:
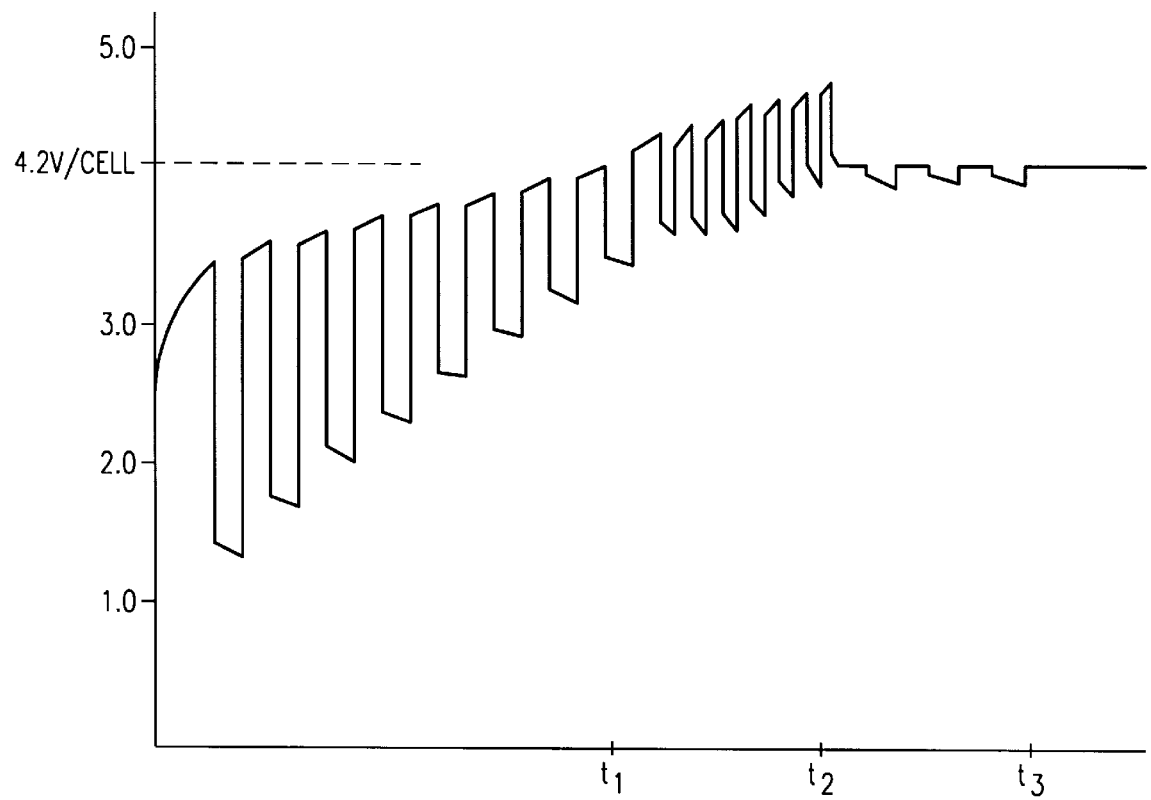
FIG. 1B shows voltage and current waveforms at the battery terminals during a cycle which includes all the steps of FIG. 1A.

FIG. 1A shows a flow-chart of a single charging cycle according to the present invention, and FIG. 1B shows voltage and current waveforms at the battery terminals during a cycle which includes all the steps of FIG. 1A.

At time $t_0$ the pass transistors are turned on, applying the charging current from the loosely-regulated voltage input to the battery terminals (step 110).

Optionally (if the power supply is able to provide a maximum current which is greater than the pass transistor can handle), the pass transistors are now chopped (repeatedly switched on and off) to limit the average current to a level which will not overheat them (step 120).

Once the cell voltage reaches a first target level at time $t_1$, operation switches to Transient-Overvoltage Pulsing (step 130), as described in U.S. Pat. No. 5,726,554 referenced above. The pulses apply a higher voltage than the critical voltage, but the resistive voltage drop (IR drop) during this period of relatively high current prevent excess voltage from ever appearing at the electrode surfaces inside the cell, and hence damage is avoided.

In the presently preferred embodiment, the electrochemical target voltage is 4.2 volts plus or minus 50 millivolts per cell, using Sony cells. The series resistance per cell is 60 to 100 milliohms. The target voltage for the first stage can be just slightly above this, e.g. 4.2 to 4.5 Volts, since a large resistive voltage drop (IR drop) is still occurring.

After time $t_2$, the FET is optionally operated to produce chopped-linear regulation (step 140). This avoids excess heat dissipation through the FETs.

After time $t_3$, when the current draw and voltage drop have become sufficiently small to be handled by the FET's thermal budget, a transition is made to continuous linear regulation (step 150). This continues until charging is terminated (step 160).

Thus the same regulator circuitry can be used to achieve current regulation during the initial stage, transient overvoltage charging thereafter, switched linear regulation thereafter, and fully analog linear regulation in the final stage.

Also, while the use of cutoff transistors is particularly beneficial, it is not required to the practice of the invention.

According to a disclosed class of innovative embodiments, there is provided: A method of charging a battery implemented in a battery technology which has an electrochemically-determined maximum threshold voltage which must not be exceeded, comprising the steps of: (a.) applying intermittent current pulses to said battery, to intermittently produce a voltage, at external terminals of said battery, which is greater than said threshold voltage; and (b.) thereafter operating a pass transistor as a linear regulator element to apply a clamped voltage to said battery which is approximately equal to said threshold voltage.

According to another disclosed class of innovative embodiments, there is provided: A method of charging a lithium-containing battery which has a electrochemically-determined maximum threshold voltage which must not be exceeded, comprising the steps of: (1.) applying current from a supply voltage which is greater than said threshold voltage, until the voltage seen across the battery reaches a first target voltage which is not substantially greater than said threshold voltage; (2.) applying intermittent current pulses to said battery, from a supply voltage which is greater than said threshold voltage, to intermittently produce a voltage, at external terminals of said battery, which is greater than said threshold voltage; (3.) thereafter operating a pass transistor intermittently as a linear regulator element, to intermittently apply a clamped voltage to said battery which is approximately equal to said threshold voltage; and (3.) thereafter operating said pass transistor continuously as a linear regulator element to apply a clamped voltage to said battery which is approximately equal to said threshold voltage.

According to another disclosed class of innovative embodiments, there is provided: A battery charging system, comprising: charging circuitry, which operates in a first phase to intermittently apply current pulses to a battery, to intermittently produce a voltage, at external terminals of said battery, which is greater than a threshold voltage; and control circuitry, which operates in a second phase to operate a pass transistor as a linear regulator element to apply a clamped voltage to said battery which is approximately equal to said threshold voltage.

According to another disclosed class of innovative embodiments, there is provided: A portable computer system, comprising: memory, and a microprocessor operatively connected to read said memory, and at least one nonvolatile bulk data storage device, all located within a single chassis; a battery located within said chassis, and electrically connected to supply power to said memory under at least some circumstances; and charging circuitry, which operates in a first phase to intermittently apply current pulses to said battery, to intermittently produce a voltage, at external terminals of said battery, which is greater than a threshold voltage; and control circuitry, which operates in a second phase to operate a pass transistor as a linear regulator element to apply a clamped voltage to said battery which is approximately equal to said threshold voltage.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, as will be obvious to those of ordinary skill in the art, other circuit elements can be added to, or substituted into, the specific circuit topologies shown.

For another example, within the constraints well-known to those of ordinary skill, power MOS transistors can be replaced by IGBT and/or MCT devices, with appropriate allowance for reduced turn-off times. In some applications power bipolar devices can also be used.

For another example, within the constraints well-known to those of ordinary skill, a variety of well-known regulator circuit configurations can be substituted for those shown.

A lithium-ion battery has a strong dependence of charge on voltage, unlike nickel metal hydride or nickel-cadmium or some other technologies. This different behavior implies that a different charging strategy is needed. The innovative battery-charging cycles described in here are may also be applied to other battery technologies, e.g. other lithium-based technologies, which have both a critical voltage which must not be exceeded and a variation in cell voltage over a substantial part of the discharge cycle. However, it should be noted that the present application also describes other innovations, using e.g. the in-pack cutoff transistors, which are not limited to lithium-based and analogous technologies.

What is claimed is:

1. A method of charging a battery implemented in a battery technology which has an electrochemically-determined maximum threshold voltage which must not be exceeded, comprising the steps of:
   (a.) applying intermittent current pulses to said battery, to intermittently produce a voltage at external terminals of said battery which is greater than said threshold voltage; and
   (b.) thereafter operating a pass transistor as a linear regulator element to apply a clamped voltage to said battery which is approximately equal to said threshold voltage, wherein said pass transistor is integrated in a single package with said battery.

2. The method of claim 1, wherein said step (b.) includes a transition from switched linear regulation to analog linear regulation.

3. The method of claim 1, wherein said step (a.) is terminated when the relaxed voltage of said battery, between ones of said pulses, reaches a second target voltage which is less than said threshold voltage.

4. The method of claim 1, wherein said step (a.) is terminated when the current passed through said battery during ones of said pulses declines to a minimum current threshold value.

5. The method of claim 1, further comprising the step of, prior to said step (a.), applying current from a supply voltage which is greater than said threshold voltage, until the voltage seen across the battery reaches a first target voltage, which is not substantially greater than said threshold voltage.

6. The method of claim 1, wherein said battery technology is a lithium-ion technology.

7. A method of charging a lithium-containing battery which has a electrochemically-determined maximum threshold voltage which must not be exceeded, comprising the steps of:
   (1.) applying current from a supply voltage which is greater than said threshold voltage, until the voltage seen across the battery reaches a first target voltage which is not substantially greater than said threshold voltage;
   (2.) applying intermittent current pulses to said battery from a supply voltage which is greater than said threshold voltage, to intermittently produce a voltage at external terminals of said battery, which is greater than said threshold voltage;
   (3.) thereafter operating a pass transistor intermittently as a linear regulator element, to intermittently apply a clamped voltage to said battery which is approximately equal to said threshold voltage; and
   (4.) thereafter operating said pass transistor continuously as a linear regulator element to apply a clamped voltage to said battery which is approximately equal to said threshold voltage, wherein said pass transistor is integrated in a single package with said battery.

8. The method of claim 7, wherein said step (2.) is terminated when the relaxed voltage of said battery, between ones of said pulses, reaches a second target voltage which is less than said threshold voltage.

9. The method of claim 7, wherein said step (2.) is terminated when the current passed through said battery during ones of said pulses declines to a minimum current threshold value.

10. The method of claim 7, wherein said battery is a lithium-ion battery.

11. A battery charging system, comprising:
   charging circuitry which operates in a first phase to intermittently apply current pulses to a battery, to intermittently produce a voltage, at external terminals of said battery, which is greater than a threshold voltage; and
   control circuitry, which operates in a second phase to operate a pass transistor as a linear regulator element to apply a clamped voltage to said battery which is approximately equal to said threshold voltage, wherein said pass transistor is integrated in a single package with said battery.

12. The method of claim 11, wherein said battery is a lithium-ion battery.

13. A portable computer system, comprising:
   memory, and a microprocessor operatively connected to read said memory, and at least one nonvolatile bulk data storage device, all located within a single chassis;
   a battery located within said chassis, and electrically connected to supply power to said memory under at least some circumstances; and
   charging circuitry, which operates in a first phase to intermittently apply current pulses to said battery, to intermittently produce a voltage at external terminals of said battery which is greater than a threshold voltage; and
   control circuitry which operates in a second phase to operate a pass transistor as a linear regulator element to apply a clamped voltage to said battery which is approximately equal to said threshold voltage, wherein said pass transistor is integrated in a single package with said battery.

14. The method of claim 13, wherein said battery is a lithium-ion battery.

15. The method of claim 1, wherein said pass transistor is operated without heat sink connections.

16. The method of claim 7, wherein said pass transistor is operated without heat sink connections.

17. The method of claim 11, wherein said pass transistor is operated without heat sink connections.

18. The method of claim 13, wherein said pass transistor is operated without heat sink connections.

* * * * *